UNITED STATES PATENT OFFICE.

WALTER ALEXANDER, OF NEW YORK, N. Y.

ADHESIVE COMPOSITION AND PROCESS OF MAKING SAME.

1,337,382.  Specification of Letters Patent.  Patented Apr. 20, 1920.

No Drawing.  Application filed March 13, 1917. Serial No. 154,453.

*To all whom it may concern:*

Be it known that I, WALTER ALEXANDER, a citizen of the United States, residing in the borough of Manhattan, in the city, county, and State of New York, have invented and discovered a certain new and useful Adhesive Composition and Process of Making Same, of which the following is a specification.

My invention relates to starch-derived adhesives and has for its particular object the production of a solid water-soluble flexible adhesive which is hard while cold; which readily liquefies with heat; which then flows thin and becomes highly adhesive, and which solidifies rapidly and then loses all tackiness upon its exposed surface, while permanently retaining its flexibility as a solid, irrespective of age or exposure to air.

In carrying out my invention by the preferred process to attain these objects, I mix a water-soluble modified starch, such as the artifical gum known as British gum, the commercial dextrins, or the like, with sufficient water to cause the mixture, after heating, to flow thin while hot. To this mixture, while fluid, I add a quantity of a hydroscopic water-soluble metallic chlorid such as magnesium chlorid, calcium chlorid, barium chlorid, and the like, but for manufacturing upon a commercial scale, I preferably employ dry calcium chlorid of commercial purity. The quantity with which I have attained the best results is an amount substantially equal by weight to the quantity of pure modified starch. I dissolve the calcium chlorid in the fluid mixture of modified starch described, with heat sufficient to maintain the mixture's fluidity, and preferably stirring the same to insure homogeneity. I am aware that small percentages of chlorids have heretofore been used with soluble starch mixtures, but such small percentages do not of themselves give to the resultant mixture a solid consistency when cold, and, on the contrary, tend to maintain the mixture in its fluid form. I have discovered, however, that by largely increasing the percentage of chlorid employed, up to 100 per cent. of the starch component, or even to 150 per cent. thereof in case of starch of commercial purity, the novel and useful results are attained which are stated as the objects of my invention.

It is to be noted that the water-soluble starch to be employed is modified prior to the addition of the hydroscopic metallic chlorid to the solution thereof. Premodification is essential since the addition of the chlorid to a water-soluble starch in which the action of the converting agent has not become arrested, will not produce my improved product, which is free from tackiness upon its exposed surface when solid. I believe freedom from tack to be due in largest part to the impregnation of the starch itself with chlorid before the formation of glucose, whose presence will make the product tacky. This result I believe to be attained by using a quantity of chlorid in excess of the amount required to saturate the water of solution, and by the addition of such chlorid to the starch solution after the activity of the modifier has produced dextrin, and by arresting its activity before the production of glucose. If the metallic chlorid be added to the starch in the presence of the converting agent and before the converting action has been arrested, I find that a relatively high percentage of glucose results in the product. Moreover, if the converting agent be an enzym, such as diastase, the enzym will be rendered inert upon the addition of the chlorid and prior to the completion of the necessary dextrinization. If the modifying agent be sodium peroxid, its presence will cause precipitation of the calcium chlorid or other similar hydroscopic metallic chlorid upon the addition of the latter prior to the arresting of the action of the modifying agent. While an enzym is preferable to an acid as a converting agent, because it produces a comparatively negligible percentage of glucose in the product, I prefer to employ sodium peroxid as a converting agent, since it has solely an oxidizing action and produces no glucose.

I am aware that an acid converting agent has been added to a solution of calcium chlorid, to which unmodified starch is then added in proportion equal to the calcium chlorid, the action of the acid being subsequently neutralized, and that a solid jelly has been thereby obtained. I do not wish to include either the use of acids as starch modifiers, because of the tackiness resultant from the glucose present in such product, nor the process by which the action of the converting agent is neutralized subsequently to the admixture of the metallic chlorid with the unconverted starch, since such a process likewise produces a tacky product. My discovery consists in the essential steps; that the starch must be premodified; the action of the modifier must be arrested prior to the addition of the calcium chlorid to the starch solution; that the quantity of calcium chlorid employed shall be sufficient substantially to saturate the starch component itself; and that to attain this result it is necessary to super-saturate the solution.

As a specific example of my process and the ingredients employed in carrying out the same, a water soluble modified starch is employed, which may be produced as follows:

100 pounds of water, and
50 pounds of commercial starch, such as corn starch, or the like, are heated together in a suitable vessel, and a converting or oxidizing agent is added thereto, such as diastase, sodium peroxid, or a suitable acid (subsequently neutralized), the heat being continued until the mixture flows thin while hot, due to the starch having become modified. These recited steps are those known to the art and customarily employed in the production of a water soluble modified starch, and will be understood without more detailed statements thereof, but are essential as statements of proportions. When this stage is reached, and the action of the converting agent has been arrested, I dissolve in the mixture while at its fluid temperature, 50 pounds of commercial dry calcium chlorid, preferably stirring the compound during its dissolution. The amount of chlorid varies, dependent upon the commercial purity of the ingredients employed. 50 pounds ordinarily suffices to produce a transparent product, colorless, if corn starch be used, and of rubber-like or leathery consistency. The amount of chlorid may be increased 25 pounds without detriment to the product, and any lack of transparency or flexibility may be corrected by such an increase of chlorid through the range stated, up to the point of saturation of the fluid starch solution, while hot.

The product is adapted to be used as a glue substitute, as a filler for cloth, as a binder, for combining purposes, and generally for all purposes for which adhesives are adapted and employed, being oil and grease proof and of low cost.

Having described my improved adhesive and the best method now known to me for making, compounding, and using the same, I claim:

1. The process of forming an adhesive composition characterized by the properties of solidity when cold, of flexibility when solid, and of thin fluidity when heated, consisting in dissolving starch, adding a modifying agent thereto, arresting the action of the modifying agent, and adding calcium chlorid to such modified starch solution until the product, when cold, becomes solid.

2. The process of forming an adhesive composition characterized by the properties of solidity when cold, of flexibility when solid, and of thin fluidity when heated, and of retaining these characteristics unimpaired by time or exposure, consisting in dissolving a previously modified starch in water, maintaining same at fluid temperature, and dissolving in said solution while at said temperature, a water-soluble metallic chlorid, continuing to dissolve such chlorid therein after the water unabsorbed by the starch is saturated, until the starch itself is impregnated, and the mixture, when cold, becomes solid.

3. The process of forming a water-soluble adhesive composition characterized by the properties of solidity when cold, of flexibility when solid, and of thin fluidity when heated, consisting in dissolving one part of corn starch and two parts of water, with heat, adding thereto a converting agent, continuing the heat until the mixture flows thin while hot, neutralizing the converting agent, dissolving in the mixture while at its fluid temperature one part of hydroscopic water-soluble metallic chlorid, and continuing to add such metallic chlorid until the product, when cold, becomes a colorless, transparent, and flexible solid.

4. The process of forming an adhesive composition having the properties of being solid when cold, flexible when solid, thinly fluid when heated, and whose surface, when cold, is free from tackiness, consisting in converting starch, arresting the action of the converting agent, dissolving the converted starch until thinly fluid, and super-saturating the solute with calcium chlorid, until the product, when cold, becomes solid.

5. The process of forming an adhesive composition having the properties described, consisting in modifying corn starch with an oxidizing agent adapted to convert such starch without the production of glucose, such as sodium peroxid, arresting the action of the oxidizing agent, dissolving the so modified starch in water with heat until thinly fluid, substantially saturating the solution while hot with a water-soluble metallic chlorid, and continuing the addition of chlorid to said mixture until the product, when cold, becomes solid, transparent and flexible.

6. A solid non-tacky starch-derived adhesive substantially free from glucose composed of hydrolyzed starch whose conversion has been arrested prior to the formation of glucose, impregnated with a water-soluble metallic chlorid, the latter being in excess of the modified starch.

7. A solid adhesive composition substantially free from glucose comprising one part of pre-modified starch, and between one and two parts of an hygroscopic metallic chlorid.

8. A solid adhesive composition substantially free from glucose composed of pre-modified starch impregnated with calcium chlorid.

9. An adhesive composition substantially free from glucose and which when cold is solid, colorless, transparent, flexible, and free from tack upon its surface, and when hot is thinly fluid and highly adhesive, composed of dextrinized corn starch and calcium chlorid.

10. An adhesive composition free from glucose and which is thinly fluid when heated, highly adhesive when fluid, solid when cold, flexible when solid, and free from tackiness upon its exposed surface, composed of dextrin derived from starch impregnated with an hygroscopic metallic chlorid, the quantity of chlorid exceeding the quantity of starch by weight.

11. An adhesive composition containing dextrinized starch and calcium chlorid, substantially free from glucose and from tackiness upon its exposed surface when cold.

WALTER ALEXANDER.